(12) United States Patent
Soo et al.

(10) Patent No.: US 9,164,629 B2
(45) Date of Patent: Oct. 20, 2015

(54) TOUCH SCREEN PANEL WITH SLIDE FEATURE

(75) Inventors: Jenn Woei Soo, Singapore (SG); Kien Beng Tan, Singapore (SG); Tze Yong Poh, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 31 days.

(21) Appl. No.: 13/567,331

(22) Filed: Aug. 6, 2012

(65) Prior Publication Data

US 2014/0035861 A1    Feb. 6, 2014

(51) Int. Cl.
| | |
|---|---|
| *G06F 3/041* | (2006.01) |
| *G06F 3/0354* | (2013.01) |
| *G06F 3/044* | (2006.01) |
| *G06F 3/0488* | (2013.01) |
| *G06F 3/0484* | (2013.01) |

(52) U.S. Cl.
CPC ............ *G06F 3/044* (2013.01); *G06F 3/04847* (2013.01); *G06F 3/04883* (2013.01); *G06F 3/03547* (2013.01); *G06F 3/041* (2013.01); *G06F 2203/04103* (2013.01)

(58) Field of Classification Search
CPC .. G06F 3/041; G06F 2203/041; G06F 3/0412
USPC .......................................................... 345/173
See application file for complete search history.

(56) References Cited

U.S. PATENT DOCUMENTS

| | | |
|---|---|---|
| 4,563,645 A | 1/1986 | Kerr |
| 5,359,156 A | 10/1994 | Chan et al. |
| 5,854,625 A | 12/1998 | Frisch et al. |
| 5,977,803 A | 11/1999 | Tsugai |
| 6,002,387 A | 12/1999 | Ronkka et al. |
| 6,075,520 A | 6/2000 | Inoue et al. |
| 6,545,612 B1 | 4/2003 | Lindgren et al. |
| 7,030,860 B1 | 4/2006 | Hsu et al. |
| 7,454,967 B2 | 11/2008 | Skurnik |
| 7,812,825 B2 | 10/2010 | Sinclair et al. |
| 8,294,678 B2 | 10/2012 | Wu |
| 8,300,024 B2 | 10/2012 | Wu |
| 8,481,872 B2 | 7/2013 | Zachut |
| 8,618,819 B2 | 12/2013 | Sawataishi et al. |
| 2003/0080755 A1 | 5/2003 | Kobayashi |
| 2003/0142081 A1* | 7/2003 | Iizuka et al. ................... 345/173 |
| 2005/0030724 A1 | 2/2005 | Ryhanen et al. |

(Continued)

OTHER PUBLICATIONS

Lei, et al., "An Oversampled Capacitance-to-Voltage Converter IC With Application to Time-Domain Characterization of MEMS Resonators", IEEE Sensors Journal, vol. 5, No. 6, Dec. 2005, pp. 1353-1361.

(Continued)

*Primary Examiner* — Srilakshmi K Kumar
*Assistant Examiner* — Carl Adams
(74) *Attorney, Agent, or Firm* — Gardere Wynne Sewell LLP

(57) ABSTRACT

A touch screen having a capacitive touch-sensitive pad overlaying a display area incorporates one or more slide features each having conductive plates. The conductive plates are located outside the display area of the touch screen and are powered via one or more connections to existing touch sensor circuitry comprising the touch-sensitive pad. The slide features of the touch screen do not obstruct a user's view of the display screen and, when compared to conventional touch screen slide features, reduce the circuitry required for detecting and/or processing a slide touch.

17 Claims, 7 Drawing Sheets

(56) References Cited

U.S. PATENT DOCUMENTS

| | | | |
|---|---|---|---|
| 2005/0094022 A1 | 5/2005 | Wang et al. | |
| 2006/0125801 A1* | 6/2006 | Hsu et al. | 345/173 |
| 2007/0070050 A1* | 3/2007 | Westerman et al. | 345/173 |
| 2007/0089527 A1 | 4/2007 | Shank et al. | |
| 2007/0159184 A1 | 7/2007 | Reynolds et al. | |
| 2007/0229470 A1 | 10/2007 | Snyder et al. | |
| 2007/0268266 A1* | 11/2007 | XiaoPing | 345/173 |
| 2007/0273660 A1* | 11/2007 | XiaoPing | 345/173 |
| 2008/0007534 A1* | 1/2008 | Peng et al. | 345/173 |
| 2009/0174679 A1 | 7/2009 | Westerman | |
| 2009/0231294 A1 | 9/2009 | Wu | |
| 2009/0244014 A1 | 10/2009 | Hotelling et al. | |
| 2009/0296742 A1 | 12/2009 | Sicurello et al. | |
| 2009/0322355 A1 | 12/2009 | Day et al. | |
| 2009/0322410 A1 | 12/2009 | David et al. | |
| 2010/0097077 A1 | 4/2010 | Philipp et al. | |
| 2010/0097078 A1 | 4/2010 | Philipp et al. | |
| 2010/0149125 A1 | 6/2010 | Klinghult et al. | |
| 2010/0149126 A1 | 6/2010 | Futter | |
| 2010/0188105 A1 | 7/2010 | Khanna et al. | |
| 2010/0289503 A1 | 11/2010 | Reynolds et al. | |
| 2010/0292945 A1 | 11/2010 | Reynolds et al. | |
| 2010/0315099 A1 | 12/2010 | Ootaka | |
| 2011/0074446 A1 | 3/2011 | Chou et al. | |
| 2011/0096024 A1 | 4/2011 | Kwak | |
| 2011/0115503 A1 | 5/2011 | Chou et al. | |
| 2011/0133756 A1 | 6/2011 | Reime | |
| 2011/0187666 A1* | 8/2011 | Min | 345/173 |
| 2011/0234528 A1 | 9/2011 | Guedon et al. | |
| 2011/0242048 A1 | 10/2011 | Guedon et al. | |
| 2011/0273400 A1 | 11/2011 | Kwon et al. | |
| 2012/0044210 A1* | 2/2012 | Chen et al. | 345/175 |
| 2012/0146668 A1 | 6/2012 | Satake et al. | |
| 2012/0200388 A1 | 8/2012 | Miura et al. | |
| 2012/0229421 A1 | 9/2012 | Kim et al. | |
| 2012/0256645 A1 | 10/2012 | Nguyen et al. | |
| 2012/0327041 A1 | 12/2012 | Harley et al. | |
| 2012/0331546 A1 | 12/2012 | Falkenburg et al. | |
| 2013/0106725 A1 | 5/2013 | Bakken et al. | |
| 2013/0154956 A1 | 6/2013 | Tudosoiu | |
| 2014/0002108 A1 | 1/2014 | Soo et al. | |
| 2014/0015595 A1 | 1/2014 | Van Ausdall et al. | |

OTHER PUBLICATIONS

U.S. Appl. No. 12/972,159 entitled "Capacitive Sensing Analog Front End", by Yannick Guedon et al, filed Mar. 31, 2010, 51 pgs.

U.S. Appl. No. 12/732,581 entitled "Sample and Hold Capacitance to Digital Converter" by Yannick Guedon, filed Mar. 26, 2010, 20 pgs.

U.S. Appl. No. 12/829,130 entitled "Sensing Phase Sequence to Suppress Single Tone Noise" by Inventor Kusuma Adi Ningrat, filed Jul. 1, 2010, 27 pgs.

* cited by examiner

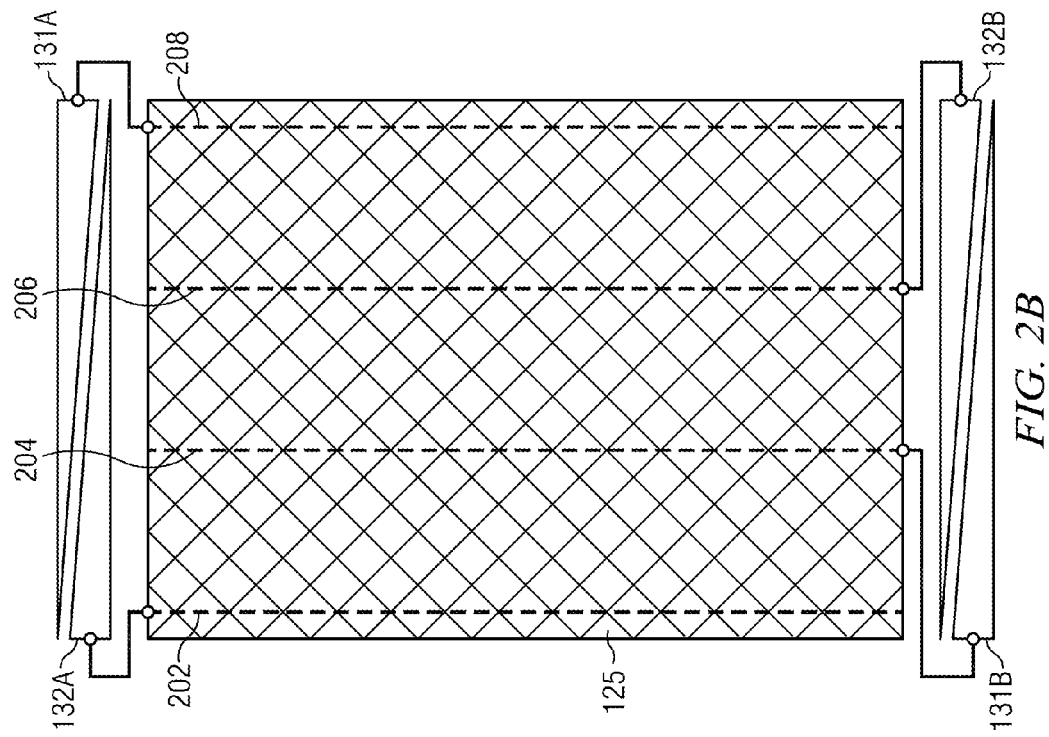
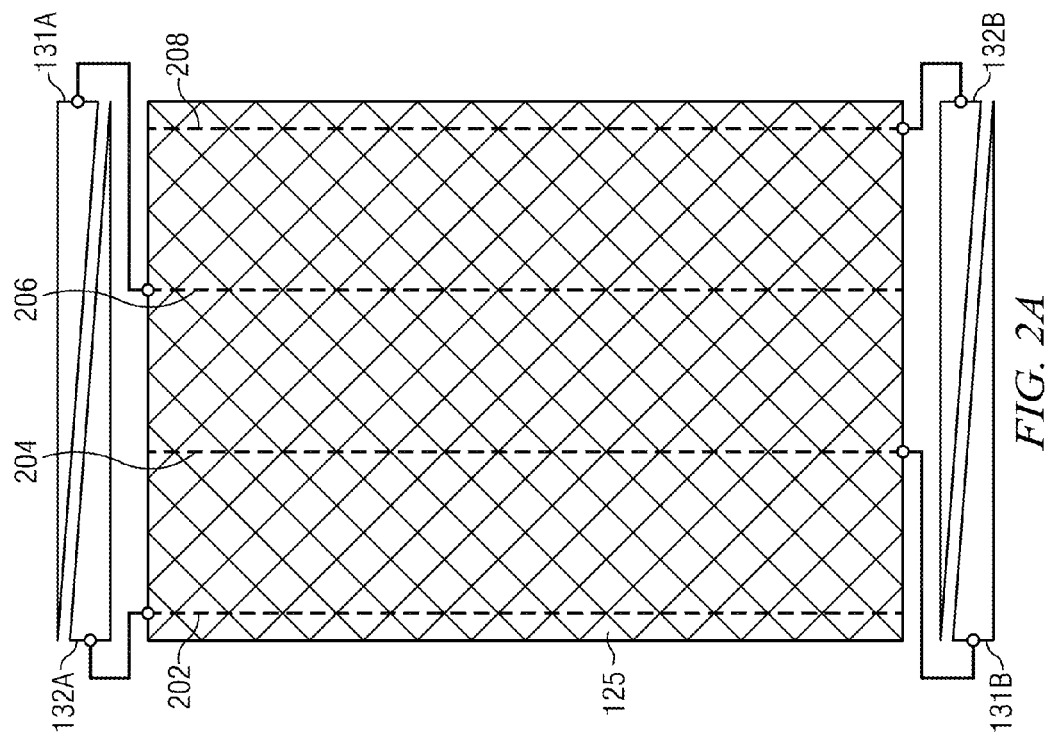

TOUCH SCREEN PANEL WITH SLIDE FEATURE

FIELD OF THE INVENTION

This invention generally relates to touch screen panels and, more particularly, to a touch screen panel implementing a slide feature.

BACKGROUND

Touch screens may be implemented in a device by overlaying a touch-sensitive pad (typically of a capacitive type) over a surface of a display screen. The display screen displays information to a user, and the touch-sensitive pad receives input by detecting the user touching the touch-sensitive pad. Capacitive touch-sensitive pads generally comprise sensors that detect a user's touch by sensing a capacitance between the user's finger and one or more of the touch sensors. The touch (i.e., capacitance) detected by the touch-sensitive pad is received as a user input that is interpreted by the device in accordance with several variables and/or conditions relating to the user's touch. Some of these variables and conditions may include the content displayed on the screen, the status of the device, the location of the touch, the duration of the touch, and combinations thereof. In order to determine some of these variables and conditions, some touch screens implement features that detect a particular type of user touch. One such example is a slide feature that is used to detect a continuous user touch moving across the surface of the touch screen.

One way to implement a slide feature in a touch screen is to designate a particular area over the display portion of the touch screen as a location for sensing the slide touch. However, this obstructs the user's view of the display screen or reduces the effective area for displaying content on the screen. Another solution for implementing a slide feature is to increase the surface area of the touch-sensitive pad to extend beyond the display area of the touch screen. In this implementation, the slide feature may be implemented using touch sensors located outside the display area of the touch screen. Although this solution does not obstruct the user's view of the display screen, the additional touch sensors require additional I/O lines for interfacing the additional touch sensors, which significantly increases the circuitry required to detect and process a user touch.

SUMMARY

The present disclosure provides a touch screen panel comprising: a plurality of sensor elements; a slide feature operable to detect a slide touch, the slide feature comprising: a first conductive plate coupled to a first channel of the sensor elements, the first conductive plate operable to generate a first changing capacitance in response to the slide touch, and a second conductive plate coupled to a second channel of the sensor elements, the second conductive plate operable to generate a second changing capacitance in response to the slide touch; first output circuitry operable to produce a first signal; and second output circuitry operable to produce a second signal.

Another embodiment provides a touch screen panel comprising: a matrix of sensor elements operable to detect a user touch, the matrix of sensor elements comprising: a plurality of first sensors, and a plurality of second sensors, wherein a first one of the first sensors and a first one of the second sensors are operable to generate a first sensing capacitance, and a second one of the first sensors and a second one of the second sensors are operable to generate a second sensing capacitance; a slide feature operable to detect a slide touch, the slide feature comprising: a first conductive plate coupled to the first one of the first sensors and operable to generate a first slide touch capacitance in response to an instant location of the slide touch relative to the first conductive plate, and a second conductive plate coupled to the second one of the first sensors and operable to generate a second slide touch capacitance in response to the instant location of the slide touch relative to the second conductive plate; and output circuitry operable, in a first mode, to produce a first output signal indicative of the user touch and operable, in a second mode, to produce a second output signal indicative of the slide touch.

The foregoing and other features and advantages of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

BRIEF DESCRIPTION OF DRAWINGS

Embodiments are illustrated by way of example in the accompanying figures not necessarily drawn to scale, in which like numbers indicate similar parts, and in which:

FIGS. 2A and 2B illustrate examples wherein respective conductive plates are shown connected to particular channels of sensor elements comprising a touch-sensitive pad;

DETAILED DESCRIPTION OF THE EMBODIMENTS

The present disclosure provides a touch screen implementing a slide feature comprised of conductive plates. The disclosed touch screen includes a capacitive touch-sensitive pad overlaying a display area. The conductive plates are located outside the display area of the touch screen and are powered via one or more connections to touch sensor circuitry comprising the touch-sensitive pad. The slide feature of the disclosed touch screen does not obstruct a user's view of the display screen and, when compared to conventional touch screen slide features, reduces the circuitry required for detecting and/or processing a slide touch. The touch screen disclosed herein may be applied to many devices including, but not limited to, mobile phones, GPS devices, tablet computers, mobile media players, remote controls, and other devices that may use a touch screen. Input provided by the slide feature of the disclosed touch screen may be used for a variety of operations. The operations performed in response to the slide touch may be customizable by software, thus, the slide feature is not limited to toggling or switching operations and may be used to control, adjust, or otherwise interface various applications, settings and/or features of the device. Examples include switching between multi-tasking applications, game control input, switching between opened browser windows, volume control, display screen brightness control, answering an incoming call, and interfacing the device.

Figure 1:
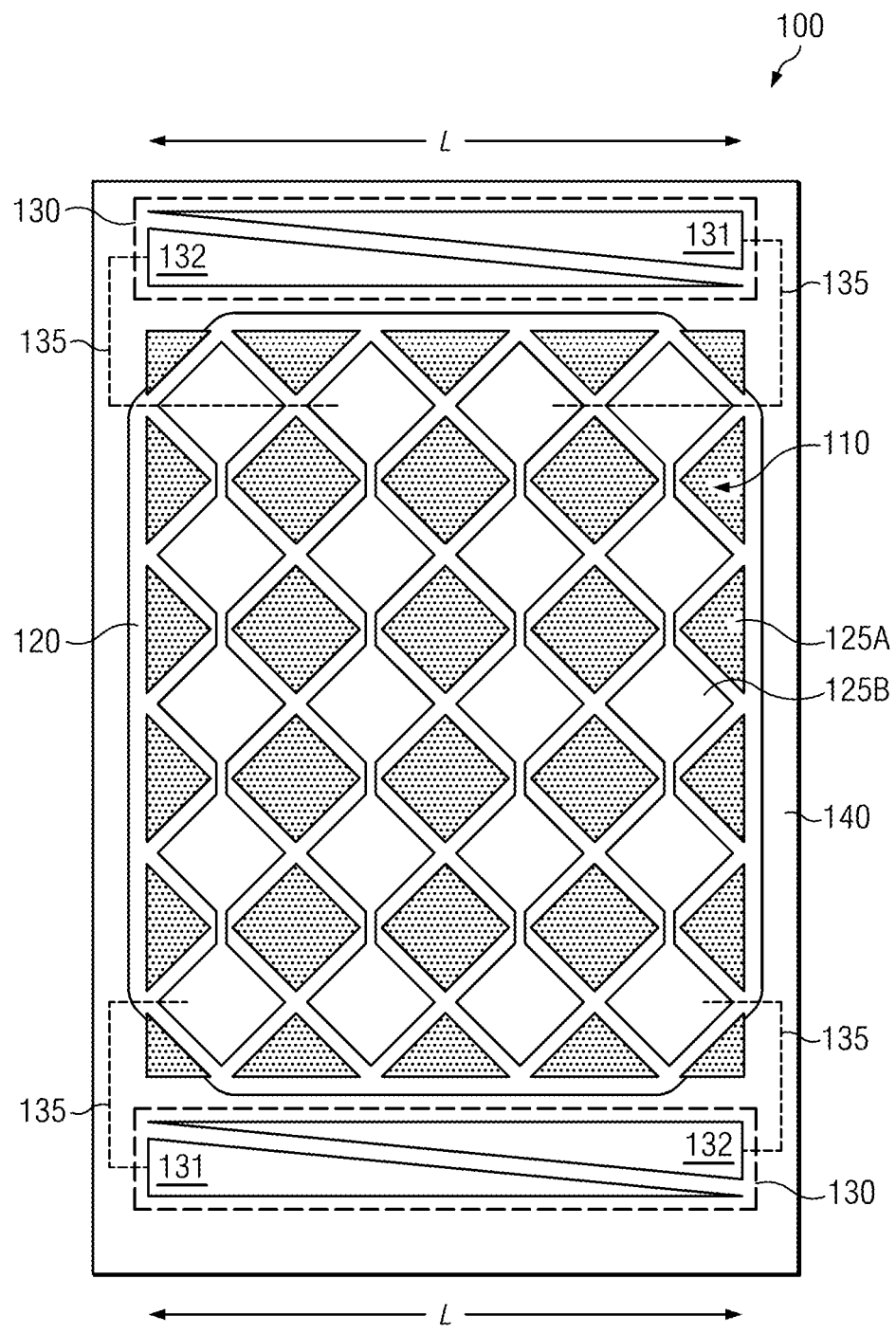
FIG. 1 illustrates an example embodiment of a touch screen implementing a slide feature in accordance with the present disclosure.

FIG. 1 illustrates an example embodiment of the disclosed touch screen 100. The touch screen 100 includes a capacitive touch-sensitive pad 110 overlaying a display surface 120. The display surface 120 may be LCD, LED, OLED, or any other type for displaying information to a user. The touch-sensitive pad 110 is comprised of a matrix of force pads 125A and sensing pads 125B, referred to collectively as sensor elements 125, and is operable to receive user input by detecting a user touching, or in proximity to, one or more of the sensor elements 125. In general, the sensor elements 125 are provided to generate a capacitance in response to a user's touch or proximity, wherein the capacitance is used to determine the user's proximity relative to the respective sensor elements 125.

The touch screen 100 further includes slide features 130 each located outside the display surface 120 for detecting a slide touch. Each slide feature 130 is comprised of a first conductive plate 131 and a second conductive plate 132, wherein each conductive plate 131/132 is coupled to one or more sensor elements 125 and the circuitry connected to one or more of the sensor elements 125. This coupling of each conductive plate 131 and 132 is illustrated as a general connection 135 in FIG. 1. However, FIGS. 2A, 2B, 3A and 3B illustrate examples wherein each respective first conductive plate 131 and second conductive plate 132 is shown connected to a particular channel of sensor elements 125 comprising the touch-sensitive pad 110. For example, in FIG. 2A, second conductive plate 132A is connected to a first outer channel 202 of sensor elements 125, first conductive plate 131B is connected to a first inner channel 204 of sensor elements 125, first conductive plate 131A is connected to a second inner channel 206 of sensor elements 125, and second conductive plate 132B is connected to a second outer channel 208 of sensor elements 125. In the example shown in FIG. 2B, second conductive plate 132A is connected to the first outer channel 202, first conductive plate 131B is connected to the first inner channel 204, second conductive plate 132B is connected to the second inner channel 206, and first conductive plate 131A is connected to the second outer channel 208.

Referring again to FIG. 1, the first and second conductive plates 131 and 132 of each slide feature 130 form inverse-facing triangular shapes, wherein the plates 131 and 132 each have a cross-sectional width that varies along the length of the respective plate. These plates 131 and 132 are disposed adjacent each other such that a user touch or proximity is detected by at least a portion of both plates 131 and 132 when the user operates the slide feature 130. Each of the conductive plates 131/132 generates a capacitance in response to a user's touch or proximity relative to the plate 131/132 in order to sense the position of the user's touch or proximity along a general direction L extending along the length of each plate 131/132. Since the plates 131/132 are wedge-shaped, the amount of surface area of a particular plate 131/132 proximate the user's touch (i.e., the user's finger, stylus, or other object) varies depending upon the position of the user's touch along the direction L. The varying surface area thereby causes the conductance generated by each plate 131/132 to vary depending upon the position of the user's touch. As will be explained in greater detail below, the variance in conductance may be used to identify the user's operation of the slide feature by detecting a slide touch. It should be appreciated that the quantity, orientation, shape, and other characteristics of the sensor elements and slide features/conductive plates may vary from that shown in the figures and described herein without departing from the scope of the present application as set forth in the claims provided below.

Referring again to FIG. 1, the touch screen 100 also includes a guard electrode 140 provided on the front surface of the touch screen 100. The guard electrode 140 is provided to mitigate stray capacitance to reduce error in the capacitance measurements obtained by the sensor elements 125 and conductive plates 131/132. In some embodiments, this may be achieved by a "bootstrapping" technique wherein the guard electrode 140 is controlled with a low impedance output applied to a known voltage (or known voltage waveform), thereby shielding the sensor elements 125 and/or conductive plates 131/132 from interfering signals and reducing effect of the guard electrode 140 on the sensor elements and/or plates.

Figure 3A:
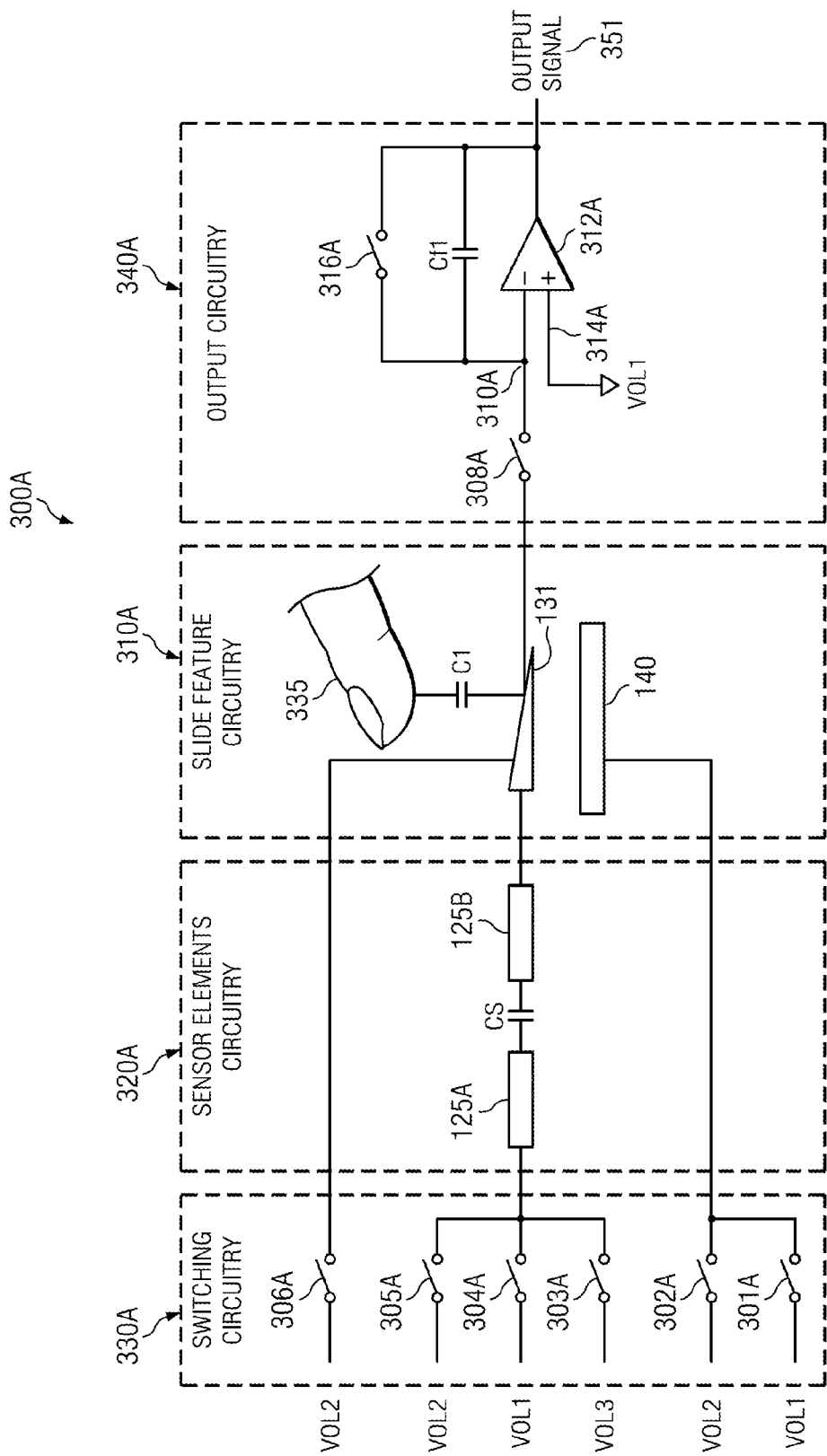
FIGS. 3A and 3B illustrate example circuit diagrams for the slide feature and other circuitry implemented in the touch screen of FIG. 1.
Figure 3B:
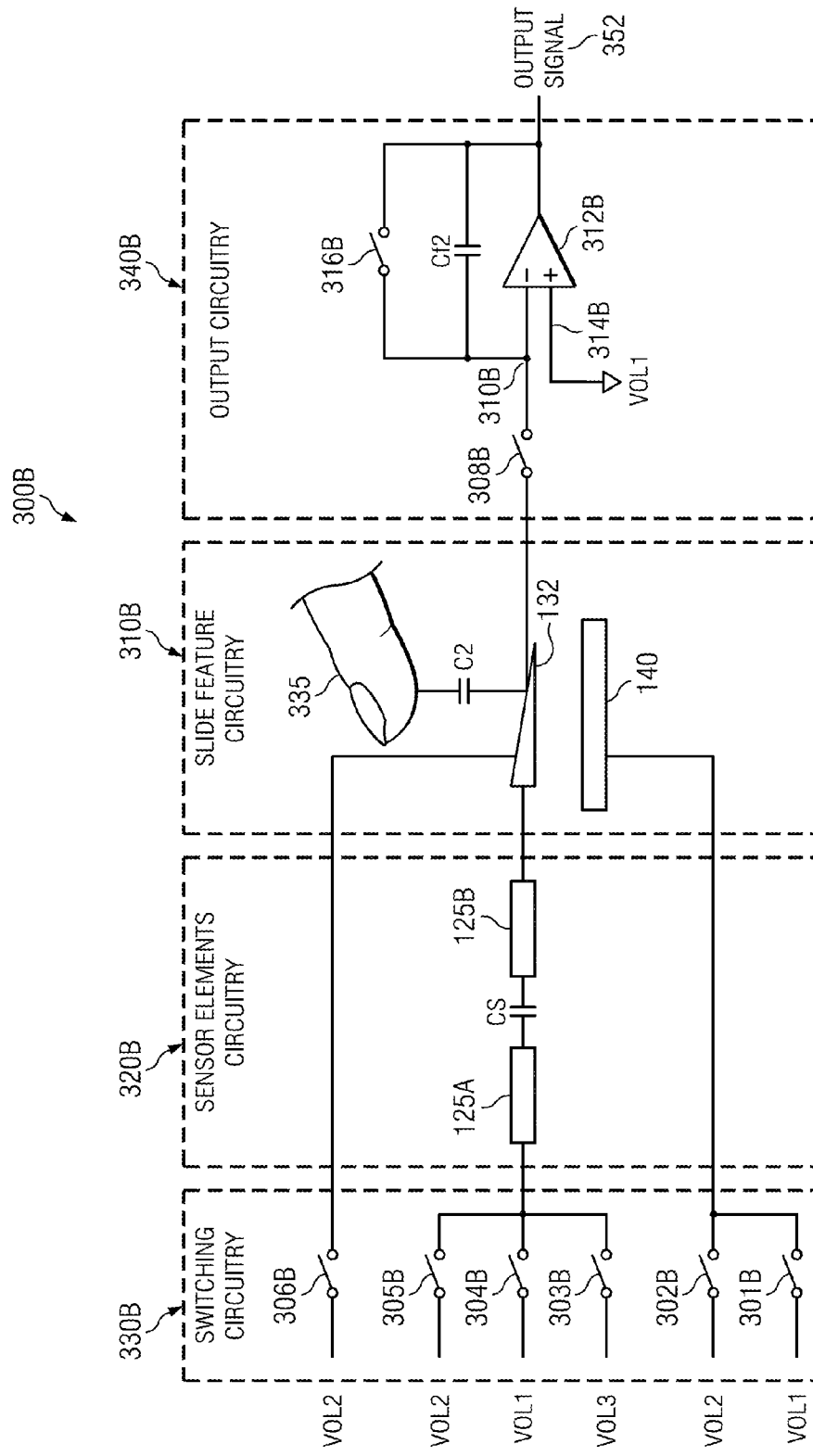

FIGS. 3A and 3B provide example circuit diagrams 300A and 300B, respectively, illustrating circuitry driving one of the slide features 130 of the touch screen 100 shown in FIG. 1. Circuit diagram 300A includes slide feature circuitry 310A, sensor elements circuitry 320A, switching circuitry 330A, and output circuitry 340A. Circuit diagram 300B includes slide feature circuitry 310B, sensor elements circuitry 320B, switching circuitry 330B, and output circuitry 340B. The first circuit 300A represents the circuitry coupled to the first conductive plate 131, and the second circuit 300B represents the circuitry coupled to the second conductive plate 132. In the embodiment illustrated in FIGS. 3A and 3B, the first and second conductive plates 131 and 132 operate independent of each other.

The switching circuitry 330A and 330B each include a plurality of switches for applying voltages VOL1, VOL2 and VOL3 to respective slide feature circuitry 310A and 310B, and sensor elements circuitry 320A and 320B. Referring to FIG. 3A, the switches include: switch 301A and switch 302A, operable to apply voltages VOL1 and VOL2, respectively, to the slide feature circuitry 310A; switch 303A, switch 304A and switch 305A, operable to apply voltages VOL3, VOL1 and VOL2, respectively, to the sensor elements circuitry 320A; and switch 306A operable to apply voltage VOL2 to the slide feature circuitry 310A. Referring to FIG. 3B, the switches include: switch 301B and switch 302B, operable to apply voltages VOL1 and VOL2, respectively, to the slide feature circuitry 310B; switch 303B, switch 304B and switch 305B, operable to apply voltages VOL3, VOL1 and VOL2, respectively, to the sensor elements circuitry 320B; and switch 306B operable to apply voltage VOL2 to the slide feature circuitry 310B.

The sensor elements circuitry 320A and 320B each include a force pad 125A and a sensing pad 125B, which form a virtual sensing capacitor CS between the force pad 125A and sense pad 125B for detecting a user touch on the touch-sensitive pad 110 proximate the respective force pad 125A and sense pad 125B. The sensor elements circuitry 320A in FIG. 3A receives voltages via switches 303A, 304A and 305A. Similarly, the sensor elements circuitry 320B in FIG. 3B receives voltages via switches 303B, 304B and 305B. As described in greater detail below, the sensing capacitor CS proportionally affects the voltage swing magnitude of the output signal produced by the respective circuit 300A or 300B. In some embodiments, the sensing capacitor CS may vary from 1 pF to 10 pF depending upon the circuit settings. For example, in the example embodiments disclosed herein with respect to FIGS. 3A and 3B, VOL1=1.65V, VOL2=3.3V, and VOL3=0V; however, it should be understood that one skilled in the art may use different voltages to generate a virtual sensing capacitor having a particular value to produce a desired output signal voltage swing magnitude for a given charge on the sensing capacitor.

Although a single force pad 125A and sensing pad 125B is shown in FIGS. 3A and 3B, it should be appreciated that the illustrated force pad 125A and sensing pad 125B are each part of a particular channel of respective force pads and sensing pads comprising the touch-sensitive pad 110 of FIG. 1. Furthermore, the sensing pads 125B illustrated in FIG. 3A are separate from the sensing pads 125B illustrated in FIG. 3B. In other words, the sensing pad 125B in FIG. 3A corresponds to a first channel of sensing pads 125B, and the sensing pad 125B in FIG. 3B corresponds to another channel of sensing pads 125B. Additionally, in some embodiments, the force pad 125A illustrated in FIG. 3A may, in fact, share the same channel as the force pad 125A illustrated in FIG. 3B.

The slide feature circuitry 310A of FIG. 3A includes a first conductive plate 131 and guard electrode 140, and the slide feature circuitry 310B of FIG. 3B includes a second conductive plate 132 and guard electrode 140. Referring to FIG. 3A, the first conductive plate 131 receives voltage VOL2 via switch 306A, and the guard electrode 140 receives voltages VOL1 and VOL2 via switches 301A and 302A, respectively. Referring to FIG. 3B, the second conductive plate 132 receives voltage VOL2 via switch 306B, and the guard electrode 140 receives voltages VOL1 and VOL2 via switches 301B and 302B, respectively. In order to simplify the illustration and corresponding description of the operation of each respective circuit 300A and 300B and conductive plate 131 and 132, the guard electrode 140 is shown in FIGS. 3A and 3B as two separate structures each controlled by a separate set of switches. However, it should be understood that the guard electrode 140 may actually comprise a single structure and may be controlled by a single set of switches. Additionally, although the guard electrode is shown included with the slide feature circuitry 310A and 310B, in some embodiments the guard electrode may be included with the sensor elements circuitry 320A and 320B, or may be included with both the slide feature circuitry 310A and 310B and the sensor elements circuitry 320A and 320B.

The circuits 300A and 300B each include output circuitry 340A and 340B coupled to the slide feature circuitry 310A and 310B, respectively. Referring to FIG. 3A, the output circuitry 340A includes switch 308A coupling the first conductive plate 131 to an inverting input node 310A of an inverting amplifier 312A. The inverting amplifier 312A receives voltage VOL1 as a reference voltage at non-inverting input 314A, and includes a feedback loop coupled between the amplifier output and the inverting input node 310A. As explained in greater detail below, the inverting amplifier 312A produces a first output signal 351. Depending upon the operation being performed by the circuit 300A, the output signal 351 may be indicative of the virtual sensing capacitance CS, or the output signal 351 may be indicative of a virtual capacitance C1 measured using the first conductive plate 131. The feedback loop comprises a feedback switch 316A coupled in parallel with a feedback capacitor Cf1, wherein the value of the feedback capacitor Cf1 inversely affects the magnitude of a voltage swing of the output signal 351 in a negative direction. In some embodiments, the feedback capacitor Cf1 may vary from 1 pF to 100 pF depending upon system requirements; however, it should be understood that one skilled in the art may choose a feedback capacitor having a particular value to produce a desired output signal voltage swing magnitude for a given charge on the feedback capacitor.

Referring now to FIG. 3B, the output circuitry 340B includes switch 308B coupling the second conductive plate 132 to an inverting input node 310B of an inverting amplifier 312B. The inverting amplifier 312B receives voltage VOL1 as a reference voltage at non-inverting input 314B, and includes a feedback loop coupled between the amplifier output and the inverting input node 310B. The inverting amplifier 312B produces a second output signal 352. Depending upon the operation being performed by the circuit 300B, the output signal 352 may be indicative of the virtual sensing capacitance CS, or the output signal 352 may be indicative of a virtual capacitance C2 measured using the second conductive plate 132. The feedback loop comprises a feedback switch 316B coupled in parallel with a feedback capacitor Cf2, wherein the value of the feedback capacitor Cf2 inversely affects the magnitude of a voltage swing of the output signal 352 in a negative direction. In some embodiments, the feedback capacitor Cf2 may vary from 1 pF to 100 pF depending upon system requirements; however, it should be understood that one skilled in the art may choose a feedback capacitor having a particular value to produce a desired output signal voltage swing magnitude for a given charge on the feedback capacitor.

The first circuit 300A is substantially identical to the second circuit 300B, and the respective first and second output signals 351 and 352 are produced in substantially the same manner. Therefore, the operation of the circuits 300A and 300B, and their respective components, is generally discussed below with respect to a single circuit 300 (i.e., the first circuit 300A or the second circuit 300B) and the corresponding output signal (i.e., first output signal 351 or second output signal 352). Thus, it should be understood that the operation of the circuit 300 as described herein, may be applied to the first circuit 300A and the second circuit 300B.

The disclosed circuit 300 performs two multiplexed operations, wherein each operation is comprised of two phases. The first operation is referred to herein as a mutual sensing operation. The mutual sensing operation involves sensing a user touch with the sensor elements circuitry 320 (and other circuitry comprising the touch pad 110). The mutual sensing operation is described in conjunction with FIGS. 3A, 3B and 4. For purposes of describing the present disclosure, the slide feature circuitry 310 may be ignored during the mutual sensing operation. The second operation is referred to herein as a slide touch-sensing operation (also referred to herein as the slide touch operation). The slide touch operation is described in conjunction with FIGS. 3A, 3B, 5A, 5B and 6. For purposes of describing the present disclosure, the sensor elements circuitry 320 may be ignored during the slide touch operation.

During both phases of the mutual sensing operation, switches 301, 302, 304 and 306 remain open and switch 308 remains closed. The remaining switches are operated in alternating fashion for each phase of the mutual sensing operation. For example, during the first phase, switches 305 and 316 are closed, and switch 303 is open. During the second phase, switches 305 and 316 are open, and switch 303 is closed.

Figure 4:
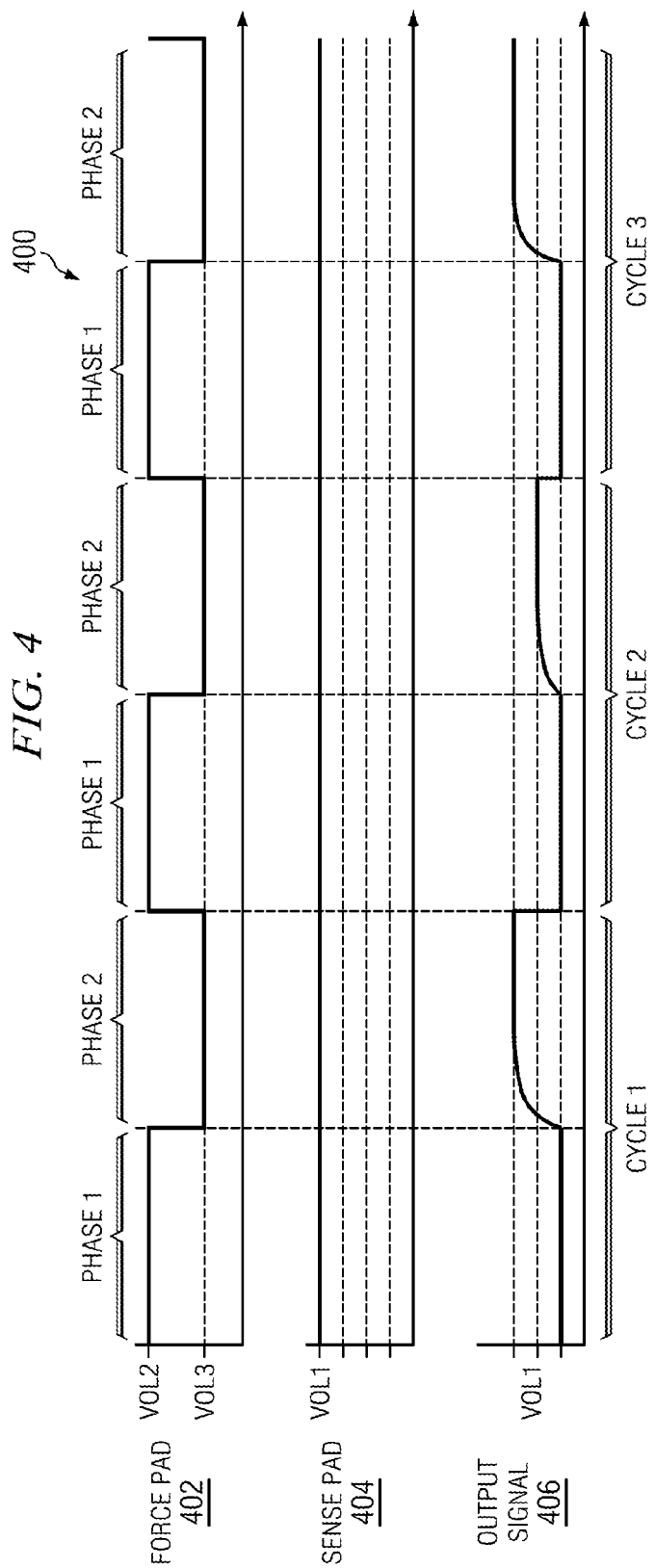
FIG. 4 illustrates an example timing diagram showing the signal waveforms for various components during both phases of the mutual sensing operation.

FIG. 4 illustrates an example timing diagram 400 showing the signal waveforms for various components of the circuit 300 during both phases of the mutual sensing operation. The waveforms provided in the timing diagram 400 include: the force pad waveform 402, the sensing pad waveform 404, and the output signal waveform 406. The timing diagram 400 illustrates three non-consecutive cycles of operation wherein the first cycle corresponds to an instance where no touch is detected by the sensor elements circuitry 320, the second cycle corresponds to an instance where a user touch is detected, and the third cycle corresponds to another instance where no touch is detected.

During the first phase, switches 305 and 316 are closed, and switch 303 is open. When switch 305 is closed, VOL2 is applied to the force pad 125A. When this occurs, the force pad 125A is biased to VOL2. Since switch 308 and switch 316 are closed, the amplifier 312 acts as a voltage follower, and sensing pad 125B is biased to VOL1, and the sensing capacitor CS is charged. Since switch 308 is closed and switch 303 is open, the feedback capacitor Cf1/Cf2 is shunted by the respective feedback switch 316 causing the feedback capacitor Cf1/Cf2 to discharge (i.e., reset) as the amplifier 312 is reset.

During the second phase, switches 305 and 316 are open, and switch 303 is closed. When switch 303 closes, VOL3 is applied to the force pad 125A, and the charge on the sensing capacitor CS (if any) is transferred to the feedback capacitor Cf1/Cf2. The inverting amplifier 312 receives the charge on the feedback capacitor Cf1/Cf2, and operates as an integrator to generate the respective first or second output signal 351 or 352.

A user (e.g., user finger, stylus, etc.) touching or proximate the sensor element circuitry 320 (i.e., interfering with a fringe electric field of the sensing capacitor CS) causes the charge on sensing capacitor CS to decrease. The charge on sensing capacitor CS proportionally affects the voltage swing magnitude of the output signal waveform 406. Thus, if no touch is detected, the charge on sensing capacitor CS (transferred to the feedback capacitor Cf1/Cf2 during the second phase) will be larger, and the magnitude of the voltage swing on the output signal 351/352 will be larger, as shown during cycles 1 and 3 of the waveform 406 in FIG. 4. The stronger the detected user touch, or closer the detected proximity of the user, the smaller the charge (from sensing capacitor CS) transferred to the feedback capacitor Cf1/Cf2 during the second phase, and the smaller the magnitude of the voltage swing on the output signal 351/352. This is illustrated by cycle 2 of the waveform 406 in FIG. 4. As discussed in greater detail below, the output signals 351 and 352 may be sampled during the second phase of each cycle to determine whether or not a user touch was detected during the mutual sensing operation.

The slide touch operation is now discussed in accordance with an example in which the circuit 300 detects proximity of a user's finger 335 using the two-phase slide touch operation, wherein a first group of switches (switches 302, 305, 306 and 316 referred to herein as Switches A) and a second group of switches (switches 301, 304 and 308 referred to herein as Switches B) are operated in alternating fashion. During the touch sensing operation, switch 303 remains open. As the user's finger 335 approaches the first and second conductive plates 131 and 132 (i.e., interferes with a fringe electric field of the plates), the finger 335 acts as a virtual ground and forms a virtual capacitance C1/C2 between the finger 335 and each of the respective plates 131 and 132. The virtual capacitance C1/C2 is inversely proportional to the distance between the finger 335 and each of the respective plates 131/132 and, in some embodiments, may range from 10 fF to 10 pF depending upon the size of the plate 131/132. Thus, the closer the finger 335 is to the plate 131/132, the greater the virtual capacitance C1/C2. The virtual capacitance C1/C2 is also proportional to the surface area of the portion of the respective plate 131/132 above which the finger 335 is located. Thus, the larger the surface area of the portion of the plate 131/132 proximate the finger 335, the larger the virtual capacitance C1/C2.

During the first phase, Switches B are opened and Switches A are closed. When Switches B are opened, the plates 131 and 132 are disconnected from their respective amplifier 312 and feedback capacitor Cf1/Cf2, and the guard electrode 140 is disconnected from VOL1. When Switches A are closed, VOL2 is applied to the plates 131 and 132 and to the guard electrode 140. VOL2 biases each plate 131 and 132 to charge the virtual capacitor C1/C2 when the finger 335 is within the fringe electric field of the respective plates 131/132. Additionally, the feedback capacitor Cf1/Cf2 is shunted by the respective feedback switch 316 causing the feedback capacitor Cf1/Cf2 to discharge (i.e., reset) as the amplifier 312 is reset. Thus, if a finger 335 was detected during the previous cycle, the output signal 351/352 returns to VOL1 (the voltage at the non-inverting input 314 of the amplifier 312). Otherwise, the output signal 351/352 remains unchanged at VOL1.

During the second phase of the touch sensing operation, Switches A are opened and Switches B are closed. When Switches A are opened, the plates 131 and 132 and guard electrode 140 are disconnected from VOL2, and the shunt provided by switch 316 is removed. When Switches B are closed, the charge from the virtual capacitor C1/C2 (if any) is transferred to the feedback capacitor Cf1/Cf2, and VOL1 is applied to the guard electrode 140. As the charge dissipates from the virtual capacitor C1/C2, the charge at the respective plates 131/132 approaches VOL1. The inverting amplifier 312 receives the charge on its feedback capacitor Cf1/Cf2, and operates as an integrator to generate the respective first or second output signal 351 or 352.

As the circuit 300 transitions from the first phase to the second phase, the virtual capacitance C1/C2 is transferred to the feedback capacitor Cf1/Cf2, as described above. The charge on the feedback capacitor Cf1/Cf2 (i.e., the virtual capacitance C1/C2 transferred at the second phase) affects the magnitude of the voltage swing occurring on the respective output signal 351/352. Thus, the magnitude of the voltage swing occurring on the output signal 351/352 may be measured to detect proximity of the finger 335 to the respective plates 131/132. Furthermore, when the plates 131 and 132 are arranged as shown in FIG. 1 and described above, the changes in the output signals 351 and 352, and the relative magnitudes of the signals 351 and 352, may be used to determine the position of the user touch, relative to the two plates 131 and 132, along the direction L. Thus, changes in the output signals 351 and 352 may be used to identify the user's operation of the slide feature 130 by detecting a slide touch as the user's touch traverses along the respective plates 131 and 132 generally along the direction L.

The circuit 300 incorporates a bootstrapping technique wherein the guard electrode 140 forms a capacitor with the adjacent conductive plate 131/132 in order to isolate the plate 131/132 from surrounding conductive materials (such as other circuitry on the PCB near the plate), thereby limiting the plate 131/132 to forming a capacitance C1/C2 with an object (e.g., user finger or stylus) located proximate the plate 131/132. As shown in FIGS. 3A and 3B, and described above, the bootstrapping technique is provided by controlling the guard electrode 140 with known voltages VOL1 and VOL2 during the two-phase slide touch operation of the circuit 300. Accordingly, stray capacitance is mitigated and resulting errors in the capacitance measurements obtained using the plate 131/132 are reduced.

Figure 5A:
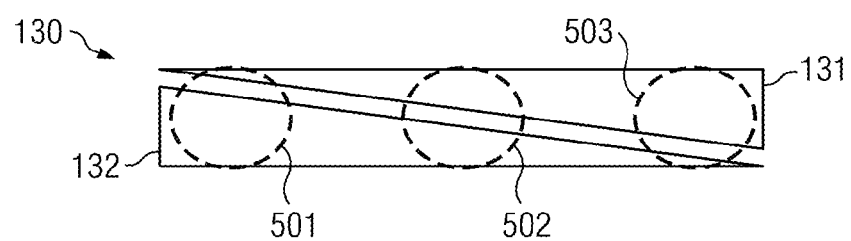
FIGS. 5A and 5B illustrate an example of locations at which a user touch is detected on a slide feature and a corresponding example timing diagram illustrating operation of the example circuit diagrams illustrated in FIGS. 3A and 3B in response to the detected user touch.
Figure 5B:
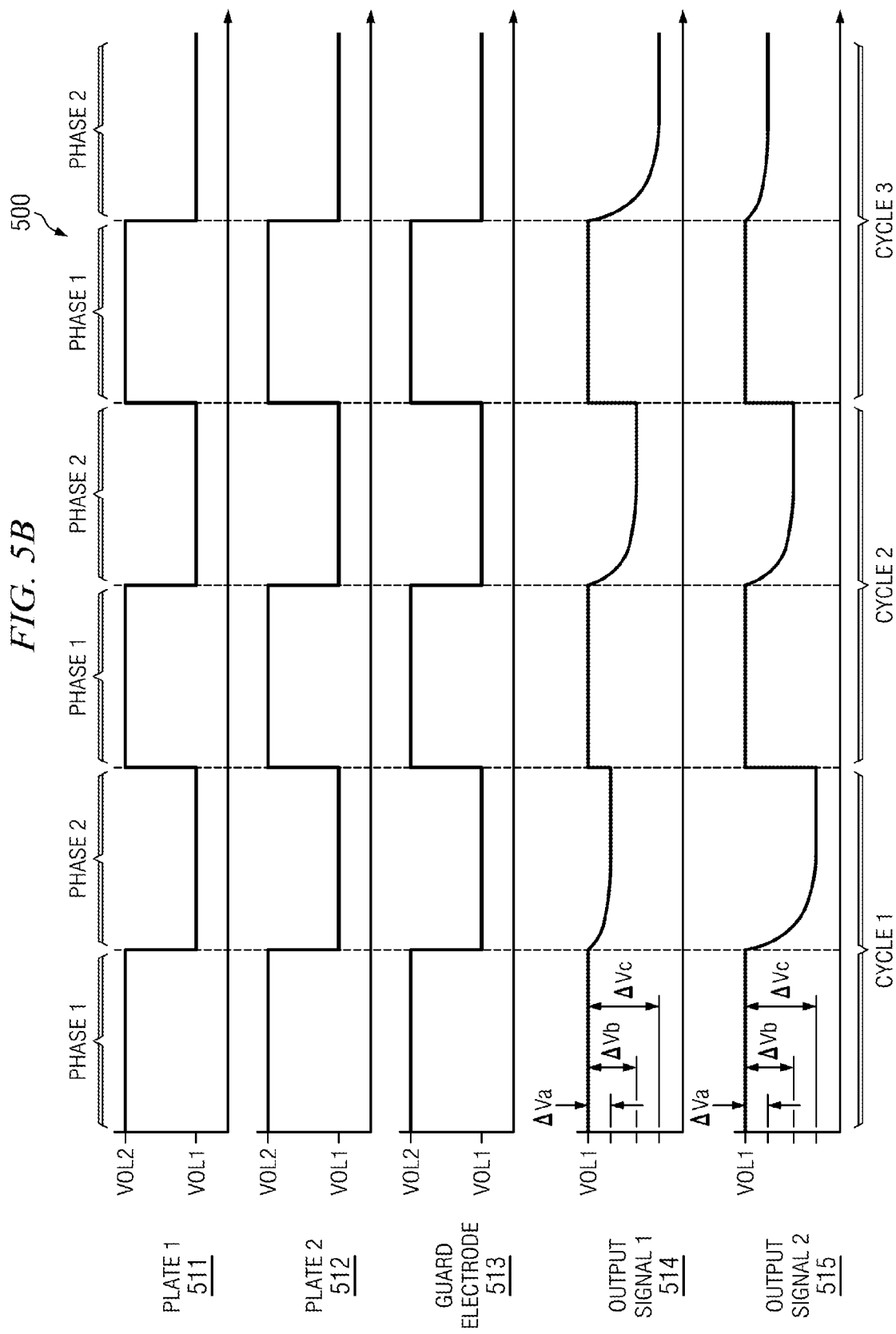

The slide touch operation of the circuit 300 is further described in accordance with an example embodiment provided in FIGS. 5A and 5B illustrating three example cycles of the two-phase slide touch operation of the circuit 300. FIG. 5A illustrates a user touch detected at different positions along the slide feature 130 for each of the three cycles, and FIG. 5B illustrates an example timing diagram 500 showing various waveforms produced by the circuit 300 in response to the three touch detections illustrated in FIG. 5A. In the example embodiment discussed with respect to FIGS. 5A and 5B, the distance between the user's finger 335 and the respective plates 131 and 132 is considered to be consistent among each of the three touch detections. Thus, variations in the capacitances C1 and C2 are dependent upon the surface areas of the portions of the respective plates above which the respective touches are detected (i.e., dependent on touch position along the length L). It should be understood that the locations of the detected user touch and timing diagram 500 illustrated in FIGS. 5A and 5B are provided to illustrate operation of the circuits 300A and 300B in FIGS. 3A and 3B in response to a user's touch detected at various locations along the slide feature 130, and is not intended to indicate a preferred location for detecting a user touch, a preferred sampling rate for detecting the user touch, or to limit or otherwise define operational requirements of the slide feature 130 or circuits 300A/300B.

Referring now to FIG. 5A, a user touch is detected at a first location 501, a second location 502, and a third location 503 above portions of the first and second conductive plates 131 and 132. Referring specifically to the first conductive plate 131 shown in FIG. 5A, the surface area of respective portions of the plate 131 proximate the locations of the user touch increases for each of the respective first, second, and third locations 501-503. Referring specifically to the second conductive plate 132 shown in FIG. 5A, the surface area of respective portions of the plate 132 proximate the locations of the user touch decreases for each of the respective first, second, and third locations 501-503. Thus, a user touch detected at the first location 501 is proximate a portion of the second conductive plate 132 having a larger surface area and a portion of the first conductive plate 131 having a smaller surface area. A user touch detected at the second location 502 is proximate portions of the first and second conductive plates 131 and 132 having substantially equal surface areas. Finally, a user touch detected at the third location 503 is proximate a portion of the second conductive plate 132 having a smaller surface area and a portion of the first conductive plate 131 having a larger surface area.

Referring now to FIG. 5B, the timing diagram 500 includes a first plate waveform 511 corresponding to the first conductive plate 131, a second plate waveform 512 corresponding to the second conductive plate 132, a guard electrode waveform 513 corresponding to the guard electrode 140, a first output signal waveform 514 corresponding to the first output signal 351, and a second output signal waveform 515 corresponding to the second output signal 352. Each of the waveforms illustrate three cycles of the slide touch operation for the circuits 300A and 300B, wherein each cycle comprises two phases (Phase 1 and Phase 2) and corresponds to one of the touch detections illustrated in FIG. 5A. As shown in FIG. 5B, the first cycle (Cycle 1) corresponds to the first touch detection 501 illustrated in FIG. 5A, the second cycle (Cycle 2) corresponds to the second touch detection 502 illustrated in FIG. 5A, and the third cycle (Cycle 3) corresponds to the third touch detection 503 illustrated in FIG. 5A.

During Cycle 1, the user touch is detected at the first location 501 illustrated in FIG. 5A. The first location 501 is proximate a portion of the second plate 132 having a larger surface area and a portion of the first plate 131 having a smaller surface area. Therefore, during Phase 1 of Cycle 1, a larger capacitance C2 is generated at the second plate 132 and a smaller capacitance C1 is generated at the first plate 131. During Phase 2 of Cycle 1, the smaller capacitance C1 is transferred to the feedback capacitor Cf1, and a smaller voltage swing $\Delta Va$ is produced on the first output signal 351, as shown by the first output signal waveform 514. Additionally, the larger capacitance C2 is transferred to the feedback capacitor Cf2, and a larger voltage swing $\Delta Vc$ is produced on the second output signal 352, as shown by the second output signal waveform 515.

During Cycle 2, the user touch is detected at the second location 502 illustrated in FIG. 5A. The second location 502 is proximate portions of the first and second plates 131 and 132 having substantially equal surface areas. Therefore, during Phase 1 of Cycle 2, a capacitance C2 is generated at the second plate 132 and a substantially equal capacitance C1 is generated at the first plate 131. During Phase 2 of Cycle 2, the capacitance C1 is transferred to the feedback capacitor Cf1, and a voltage swing $\Delta Vb$ is produced on the first output signal 351, as shown by the first output signal waveform 514. Additionally, the substantially equal capacitance C2 is transferred to the feedback capacitor Cf2, and the voltage swing $\Delta Vb$ is produced on the second output signal 352, as shown by the second output signal waveform 515.

During Cycle 3, the user touch is detected at the third location 503 illustrated in FIG. 5A. The third location 503 is proximate a portion of the second plate 132 having a smaller surface area and a portion of the first plate 131 having a larger surface area. Therefore, during Phase 1 of Cycle 3, a smaller capacitance C2 is generated at the second plate 132 and a larger capacitance C1 is generated at the first plate 131. During Phase 2 of Cycle 3, the larger capacitance C1 is transferred to the feedback capacitor Cf1, and a larger voltage swing $\Delta Vc$ is produced on the first output signal 351, as shown by the first output signal waveform 514. Additionally, the smaller capacitance C2 is transferred to the feedback capacitor Cf2, and a smaller voltage swing $\Delta Va$ is produced on the second output signal 352, as shown by the second output signal waveform 515.

In the example embodiment illustrated in FIGS. 5A and 5B, VOL1=1.65V, VOL2=3.3V, $\Delta Va$=10 mV, $\Delta Vb$=50 mV, and $\Delta Vc$=100 mV.

Figure 6:
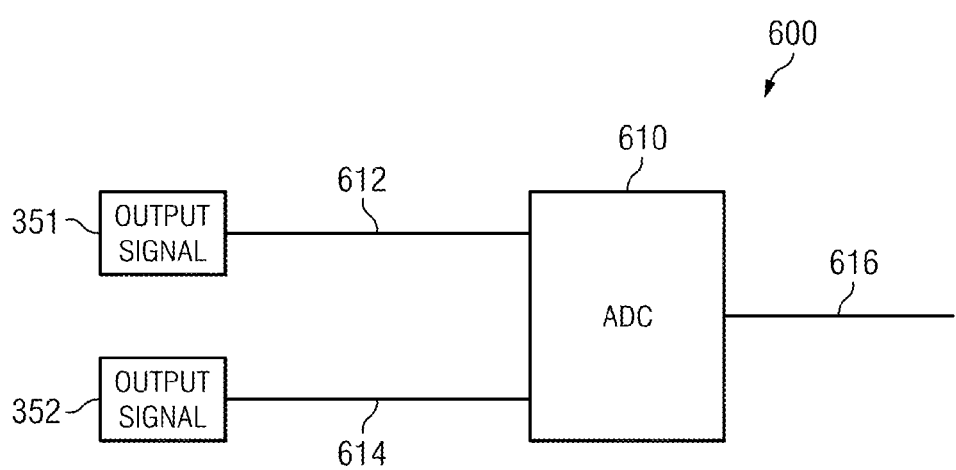
FIG. 6 illustrates an example embodiment of processing circuitry implemented to evaluate the first and second output signals produced by the circuits illustrated in FIGS. 3A and 3B.

In accordance with the foregoing, the respective first and second output signals 351 and 352 may be sampled during the second phase of each cycle. The output signals 351 and 352 may be sampled from the second phase of the mutual sensing operation to determine if a user touch is detected by the sensor elements circuitry 320. Similarly, the output signals 351 and 352 may be sampled during the second phase of the slide touch operation to determine the relative position of the user touch along the length L, relative to the two plates 131 and 132, which may be used to identify the user's operation of the slide feature 130. FIG. 6 illustrates example circuitry 600, shown in block diagram format, that may be implemented to evaluate the respective first and second output signals 351 and 352 as discussed above. The circuitry 600 includes processing circuitry 610 that may comprise, for example, an analog-to-digital converter and other circuitry. The processing circuitry 610 receives, at a first input 612, the first output signal 351 from the amplifier 312A in FIG. 3A and, at a second input 614, the second output signal 352 from the amplifier 312B in FIG. 3B. The processing circuitry 610 produces an output signal 616 that, in some embodiments, may indicate a detected user touch or the user's operation of the slide feature 130.

In some embodiments, the processing circuitry 610 may evaluate the magnitude and/or the rate of change of the respective first and second output signals 351 and 352 to determine the relative location of a detected user touch along the slide feature 130. The processing circuitry 610 may also evaluate the order in which the output signals 351 and 352 fluctuate (in consideration with the magnitudes and/or rates of change of those fluctuating signals) in order to determine whether or not the user touch was continuous across the slide feature 130. This information provides an indication of slide direction, slide length, slide speed, as well as other data. Accordingly, the output signal 616 may be used to indicate a slide touch resulting from successful operation of the slide feature 130.

In some embodiments, the processing circuitry output signal 616 may be utilized by additional circuitry (not shown) to perform various operations in response to the detected touch or slide touch. These operations may be customizable by software and may include, for example, toggling or switching operations, controlling, adjusting, or otherwise interfacing various applications, settings and/or features of a device, switching between multi-tasking applications, providing game control input, switching between opened browser windows, controlling volume, controlling display screen brightness, answering an incoming call, and interfacing the device. It should be appreciated that the various embodiments provided herein are intended to provide one or more examples for illustrating and/or describing the disclosed touch screen implementing a slide feature comprised of conductive plates. As such, the disclosed touch screen circuitry and slide feature are not limited to the operations, features, or functions disclosed herein, and may provide advantages other than those discussed herein.

What is claimed is:

1. A touch screen panel, comprising:
    a display portion;
    a plurality of sensor elements disposed within the display portion of the touch screen panel and operable to detect a user touch on the display portion of the touch screen panel, wherein the plurality of sensor elements are further operable to generate a touch capacitance in response to the user touch on the display portion of the touch screen panel;
    a slide feature operable to detect a slide touch, the slide feature comprising:
        a first conductive plate coupled in series with a first channel of the sensor elements, the first conductive plate operable to generate a first changing capacitance in response to the slide touch, and
        a second conductive plate coupled in series with a second channel of the sensor elements, the second conductive plate operable to generate a second changing capacitance in response to the slide touch; and
    output circuitry operable in a first mode and a second mode, the output circuitry comprising:
        a first switched integrator circuit operable to produce a first output signal, wherein, during the first mode, the first output signal is indicative of the user touch on the display portion of the touch screen panel and, during the second mode, the first output signal is indicative of the slide touch,
            wherein, during the first mode, the first switched integrator circuit is operable during a first phase to apply a voltage to at least a portion of the plurality of sensor elements, and operable during a second phase to transfer a first touch capacitance to a first capacitor to produce the first output signal indicative of the user touch, and
            wherein, during the second mode, the first switched integrator circuit is operable during a first phase to apply a voltage to the first conductive plate, and operable during a second phase to transfer the first changing capacitance to the first capacitor to produce the first output signal indicative of the slide touch; and
        a second switched integrator circuit operable to produce a second output signal, wherein, during the first mode, the second output signal is indicative of the user touch on the display portion of the touch screen panel and, during the second mode, the second output signal is indicative of the slide touch,
            wherein, during the first mode, the second switched integrator circuit is operable during a first phase to apply a voltage to at least a portion of the plurality of sensor elements, and operable during a second phase to transfer a second touch capacitance to a second capacitor to produce the second output signal indicative of the user touch, and
            wherein, during the second mode, the second switched integrator circuit is operable during a first phase to apply a voltage to the second conductive plate, and operable during a second phase to transfer the second changing capacitance to the second capacitor to produce the second output signal indicative of the slide touch.

2. The touch screen panel as set forth in claim 1, wherein, during the second mode, relative magnitudes of the first output signal and the second output signal indicate a location of the slide touch along the slide feature.

3. The touch screen panel as set forth in claim 1, wherein at least one of the sensor elements is operable with a second sensor element to produce the first touch capacitance.

4. The touch screen panel as set forth in claim 1, wherein at least a third sensor element is operable with a fourth sensor element to produce the second touch capacitance.

5. The touch screen panel as set forth in claim 1, wherein, during the first mode, the magnitude of the first output signal or second output signal indicates detection of the user touch by the sensor elements.

6. The touch screen panel as set forth in claim 1, further comprising output circuitry operable to receive the first output signal and the second output signal, and to produce a third output signal indicative of the slide touch or the user touch.

7. The touch screen panel as set forth in claim 1, wherein the first and second conductive plates form inverse-facing triangular shapes.

8. The touch screen panel as set forth in claim 1, wherein at least one of the first and second conductive plates has a cross-sectional width that varies along a length of the at least one of the first and second conductive plates.

9. The touch screen panel as set forth in claim 1, wherein the slide feature is disposed outside the display portion of the touch screen panel.

10. A touch screen panel, comprising:
    a display portion;
    a matrix of sensor elements disposed within the display portion, the matrix of sensor elements operable to detect a user touch on the display portion of the touch screen panel, the matrix of sensor elements comprising:
        a plurality of first sensors, and
        a plurality of second sensors,
        wherein a first one of the first sensors and a first one of the second sensors are operable to generate a first sensing capacitance in response to a location of the user touch on the display portion of the touch screen panel, and a second one of the first sensors and a second one of the second sensors are operable to generate a second sensing capacitance in response to a location of the user touch on the display portion of the touch screen panel;
a slide feature operable to detect a slide touch, the slide feature comprising:
  a first conductive plate coupled in series with the first one of the first sensors and operable to generate a first slide touch capacitance in response to an instant location of the slide touch relative to the first conductive plate, and
  a second conductive plate coupled in series with the second one of the first sensors and operable to generate a second slide touch capacitance in response to the instant location of the slide touch relative to the second conductive plate; and
output circuitry operable in a first mode and a second mode, the output circuitry comprising:
  a first switched integrator circuit operable to produce a first output signal, wherein during the first mode, the first output signal is indicative of the user touch and, during the second mode, the first output signal is indicative of the slide touch,
    wherein, during the first mode, the first switched integrator circuit is operable during a first phase to apply a voltage to the first one of the second sensors, and operable during a second phase to transfer the first sensing capacitance to a first capacitor to produce the first output signal indicative of the user touch, and
    wherein, during the second mode, the first switched integrator circuit is operable during a first phase to apply a voltage to the first capacitive plate, and operable during a second phase to transfer the first slide touch capacitance to the first capacitor to produce the first output signal indicative of the slide touch; and
  a second switched integrator circuit operable to produce a second output signal, wherein during the first mode, the second output signal is indicative of the user touch and, during the second mode, the second output signal is indicative of the slide touch,
    wherein, during the first mode, the second switched integrator circuit is operable during a first phase to apply a voltage to the second one of the second sensors, and operable during a second phase to transfer the second sensing capacitance to a second capacitor to produce the second output signal indicative of the user touch, and
    wherein, during the second mode, the second switched integrator circuit is operable during a first phase to apply a voltage to the second capacitive plate, and operable during a second phase to transfer the second slide touch capacitance to the second capacitor to produce the second output signal indicative of the slide touch.

11. The touch screen panel as set forth in claim 10, wherein, during the second mode, relative magnitudes of the first and second output signals indicate the instant location of the slide touch along the slide feature.

12. The touch screen panel as set forth in claim 10, wherein, during the first mode, the magnitude of the first or second output signal indicates the user touch detected by the matrix of sensor elements.

13. The touch screen panel as set forth in claim 10, wherein the first and second conductive plates each have a cross-sectional width that varies along a length of the respective first and second conductive plates.

14. The touch screen panel as set forth in claim 13, wherein the first slide touch capacitance is indicative of the cross-sectional width of the first conductive plate proximate the instant location of the slide touch, and the second slide touch capacitance is indicative of the cross-sectional width of the second conductive plate proximate the instant location of the slide touch.

15. The touch screen panel as set forth in claim 10, wherein the first and second conductive plates form inverse-facing triangular shapes.

16. The touch screen panel as set forth in claim 10, wherein the second output signal is indicative of an instant location of the slide touch along a length of the slide feature.

17. The touch screen panel as set forth in claim 10, wherein the slide feature is disposed outside the display portion of the touch screen panel.

* * * * *